United States Patent [19]

Spohn, Jr.

[11] 4,118,141

[45] Oct. 3, 1978

[54] ATTACHMENT FOR A ROTARY DRIVE MACHINE

[76] Inventor: Daniel M. Spohn, Jr., 8451 Miller Rd., Swartz Creek, Mich. 48473

[21] Appl. No.: 744,628

[22] Filed: Nov. 24, 1976

Related U.S. Application Data

[63] Continuation-in-part of Ser. No. 671,597, Mar. 29, 1976, abandoned.

[51] Int. Cl.² .................... B23B 47/00; B23B 39/12
[52] U.S. Cl. .................................. 408/90; 408/236; 408/237
[58] Field of Search .......... 408/234, 236, 237, 241 R, 408/90

[56] References Cited

U.S. PATENT DOCUMENTS

| | | | |
|---|---|---|---|
| 324,759 | 8/1885 | Elliott | 408/90 |
| 361,105 | 4/1887 | Winchell | 408/90 X |
| 1,499,456 | 7/1924 | Hartmann | 408/90 |
| 1,715,320 | 5/1929 | De Roo et al. | 408/237 |
| 2,480,554 | 8/1949 | Couse | 408/236 X |
| 2,629,268 | 2/1953 | Budney | 408/236 |
| 2,963,057 | 12/1960 | Morse | 408/236 X |

Primary Examiner—Othell M. Simpson
Attorney, Agent, or Firm—Gifford, Chandler, VanOphem, Sheridan & Sprinkle

[57] ABSTRACT

An attachment for a rotary drive machine of the type having a support stand and power tool means adapted to be mounted on the stand comprising an arm member disposed between and connecting the support stand to the power tool means. The arm member is rotatably secured at one longitudinal end to the support stand and is rotatably secured to and supports the power tool means at its other end. Locking means are provided for locking the arm member to the support stand in its adjusted rotated position while similar locking means are also provided for locking the arm member to the power tool means in its adjusted rotated position.

4 Claims, 9 Drawing Figures

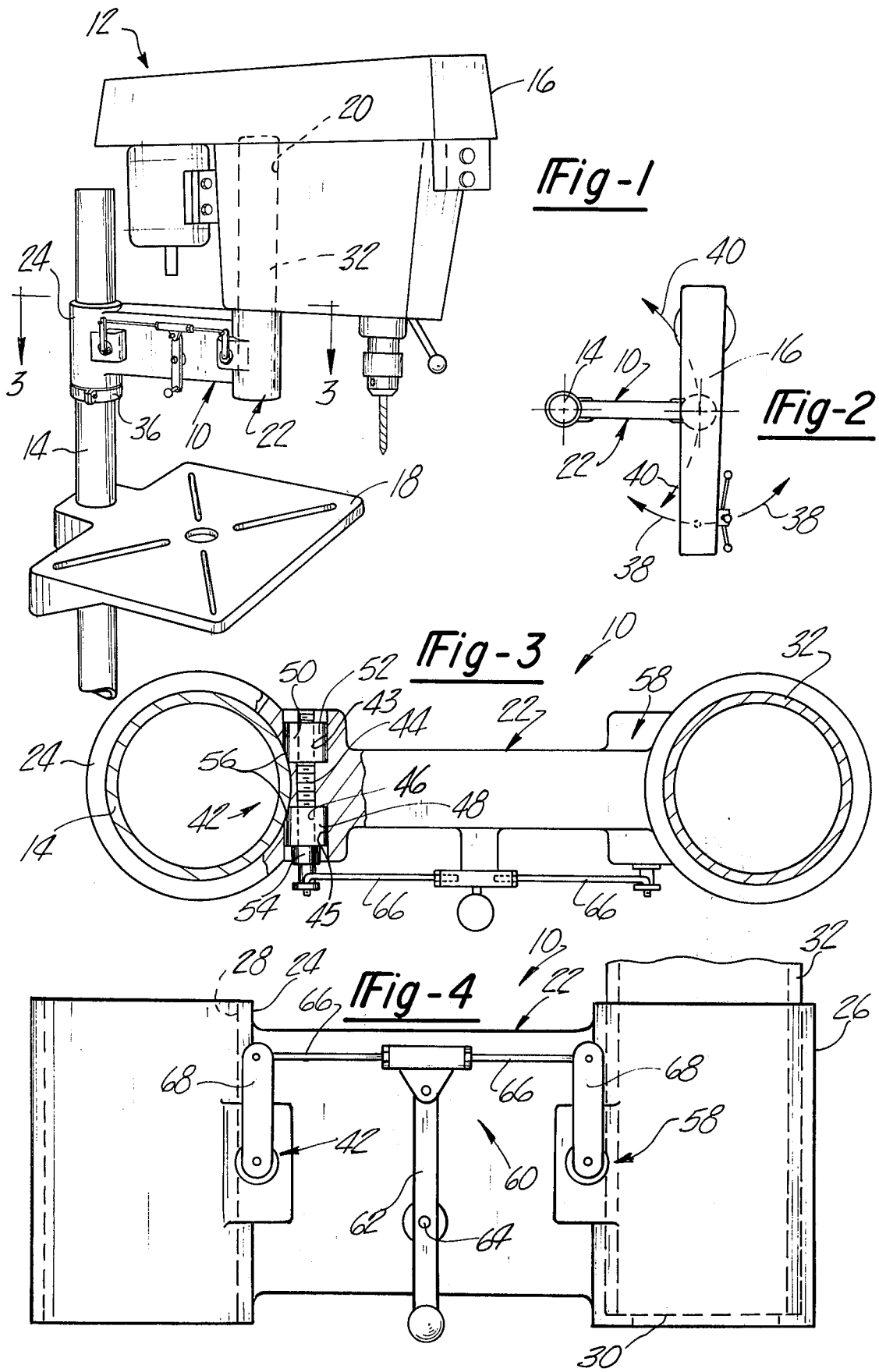

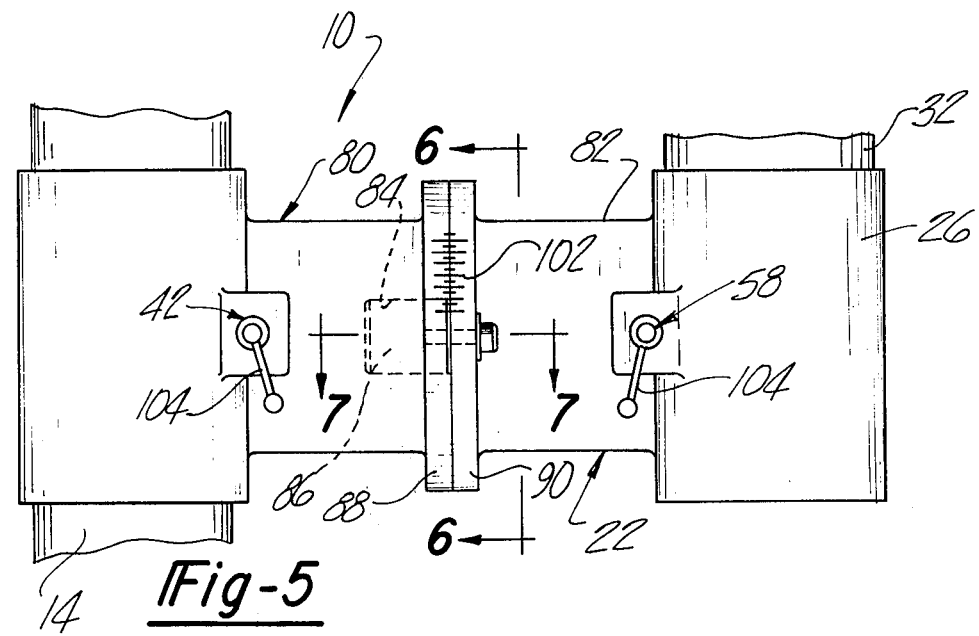
Fig-5
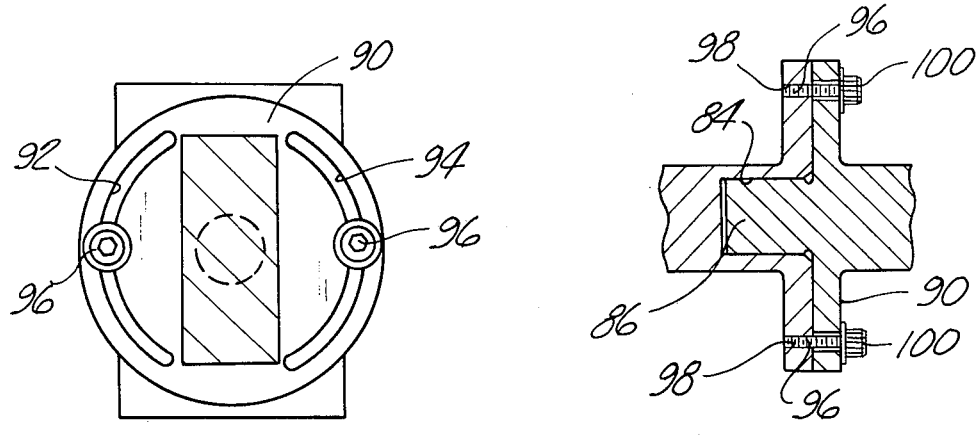
Fig-6
Fig-7
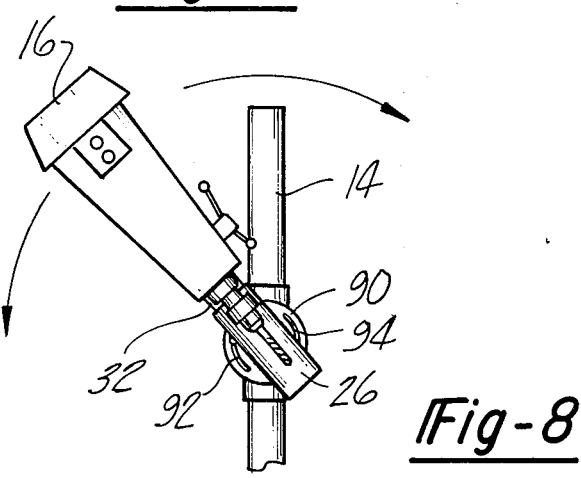
Fig-8

ATTACHMENT FOR A ROTARY DRIVE MACHINE

RELATIONSHIP TO OTHER APPLICATIONS

This application is a continuation-in-part of Application Ser. No. 671,597, filed Mar. 29, 1976 and now abandoned.

BACKGROUND OF THE INVENTION

1. Field of the Invention

The present invention relates to an attachment for a rotary drive machine of the type having a support stand and power tool means adapted to be mounted on the support stand.

2. Description of the Prior Art

Rotary drive machines, such as drill presses, typically include a power tool means secured to and supported by a generally vertical support stand or column. With these previously known rotary drive machines, the power tool means are rotatably carried by the support stand so that the power tool means may pivot around the generally vertical support stand.

These previously known rotary drive machines, however, lack flexibility in that the distance between the axis of rotation of the power tool means and the position of the machine operation, hereinafter called the machining radius, is fixed. For example, if the power tool means is a drill press and a radial hole pattern is desired, the radius of the hole pattern obtained by pivoting the drill press is predetermined and not adjustable.

While rotary drive machines have been devised in which the machining radius is adjustable, rotary drive machines of this type are much more expensive than the conventional rotary drive machines. Moreover, no previous attachment has been heretofore known for converting a conventional rotary drive machine having a fixed machining radius to a rotary drive machine having an adjustable machining radius.

SUMMARY OF THE PRESENT INVENTION

The present invention obviates the above mentioned disadvantages of the previously known rotary drive machines by providing an attachment for use in conjunction with such machines. The attachment of the present invention is operable to convert a rotary drive machine of the type having a fixed machining radius to a rotary drive machine of the type in which the machining radius is adjustable.

The attachment of the present invention generally comprises a horizontally elongated arm member. One longitudinal end of the arm member is rotatably coupled around a vertical axis to the support stand. The other end of the arm member is rotatably coupled to and supports the power tool means so that the power tool means may also pivot on the arm member around a vertical axis. In this manner the attachment of the present invention provides two vertical axes of rotation or degrees of freedom between the support stand and the power tool means. The dual axes of rotation provide an adjustable machining radius for the rotary drive machine which is infinitely adjustable as will become hereinafter apparent.

Conventional locking means are provided to lock both the arm member to the support stand and the power tool means to the arm member in their respective adjusted rotated positions.

In a modification of the invention the arm member is segmented into first and second coaxial portions. The first portion is rotatably coupled to the support stand while the second portion is rotatably coupled to the power tool means as previously described. In addition, the second portion is rotatably coupled to the first portion around the longitudinal axis of the arm member and means are provided to lock the first and second portions in their adjusted longitudinally rotated positions.

BRIEF DESCRIPTION OF THE DRAWINGS

A better understanding of the present invention will be had upon reference to the following detailed description when read in conjunction with the accompanying drawings wherein like reference characters refer to like parts throughout the several views and in which:

FIG. 1 is a perspective view showing a first preferred embodiment of the present invention mounted onto a rotary drive machine;

FIG. 2 is a fragmentary top plan view showing the embodiment shown in FIG. 1;

FIG. 3 is an enlarged, fragmentary partial cross sectional view of the embodiment shown in FIGS. 1 and 2 and taken substantially along line 3—3 in FIG. 1;

FIG. 4 is a side plan view of the embodiment of the present invention enlarged for clarity;

FIG. 5 is a side plan view of another preferred embodiment of the present invention;

FIG. 6 is a partial cross sectional view taken substantially along line 6—6 in FIG. 5;

FIG. 7 is a fragmentary cross sectional view of the attachment of the present invention taken substantially along line 7—7 in FIG. 5;

FIG. 8 is a front plan view showing the embodiment of the present invention illustrated in FIGS. 5-7 secured to a rotary drive machine;

DETAILED DESCRIPTION OF THE PRESENT INVENTION

Figure 9:
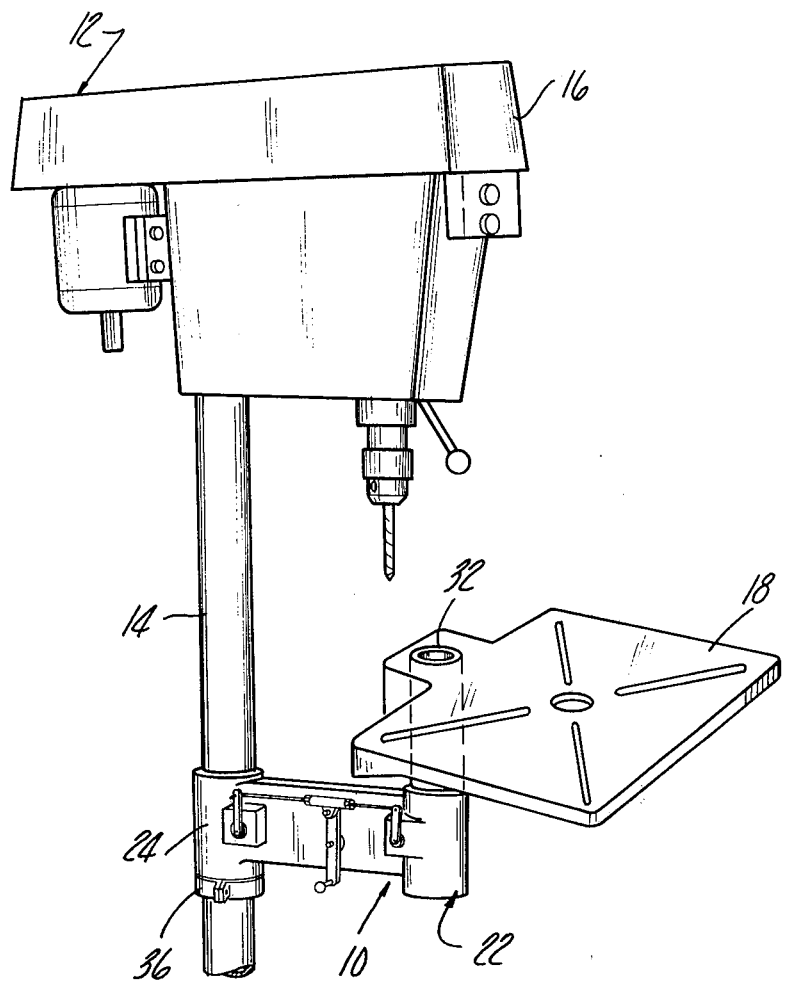
FIG. 9 is a view similar to FIG. 1 but illustrating another preferred modification of the present invention.

With reference particularly to FIG. 1, the attachment 10 of the present invention is there shown secured to a rotary drive machine 12. The rotary drive machine 12, which is illustrated as a drill press, comprises an elongated and generally vertical and cylindrical support stand or column 14 and a power tool means 16. A vertically elongated cylindrical recess 20 is formed in the power tool means 16 and receives the support stand 14 therein so that the power tool means 16 normally rotatably sits upon the support stand 14. Thus the power tool means 16 is detached from the support stand 14 prior to installing the attachment 10 of the present invention to the rotary drive machine 12.

With reference now particularly to FIGS. 3 and 4, the attachment 10 of the present invention is there shown and comprises a horizontally elongated arm member 22. A first tubular cylindrical portion 24 is secured at one longitudinal end of the arm member 22 while a second tubular cylindrical portion 26 is secured at the other longitudinal end of the arm member 22 so that the axes of the tubular portions 24 and 26' are in a spaced and parallel relationship. The internal bore 28 of the first tubular portion 24 is substantially the same or slightly larger than the outer diameter of the support stand 14 so that the support stand 14 is slidably received through the first tubular portion 24. A flange 30 (FIG. 4) extends upwardly from the bottom of the second tubular portion 26 and is so that the second tubular portion 26 retains and rotatably supports a vertically upwardly extending tube 32.

With reference to FIGS. 1 and 2, the first tubular portion 24 is shown installed on the support stand 14 and the axial travel of the tubular portion 24 along the support stand 14 is limited by an adjustable collar 36 which is rigidly locked to the support stand 14. At the opposite end of the arm member 22, the tube 32 extends upwardly into the recess 20 in the power tool means 16 so that the power tool means 16 is supported by the tube 32 and the arm member 22. Means (not shown) are preferably provided to prevent rotation of the tube 32 within the recess 20.

Referring now to FIG. 2, the rotation of the power tool means 16 relative to the attachment 22 is illustrated by arrows 38. Likewise, the rotation of the attachment 10 with the attached power tool means 16 around the support stand 14 is illustrated by arrows 40. In this manner it can be seen that with the attachment 10 of the present invention any desired machining radius may be achieved by merely adjusting the rotational position of the arm member 22 around the support stand 14 relative to the power tool means 16. Moreover, the machining radius is infinitely adjustable.

Referring again to FIGS. 3-4, the attachment 10 includes locking means 42 for locking the arm member 22 to the support stand 14 in the adjusted rotated position. Although any conventional locking means may be used, as shown, the locking means 42 comprises a threaded cylindrical member 44 respectively disposed through an axial bore 46 in a first cam member 48 and threadably engaging an axial bore 50 in a second cam member 52.

Both cam members 48 and 52 are positioned in transverse recesses 43 and 45 in the arm member 22 and adjacent the tubular portion 24. An enlarged diameter portion 54 of the threaded member 44 abuts against the outer axial end of the first cam member 48 so that rotation of the threaded member 44 causes the cam members 48 and 52 to move toward each other. A cam surface 56 on each of the cam members 48 and 52 abuts against the support stand 14 so that as the cam members 48 and 52 move towards each other, the cam surfaces 56 frictionally engage the support stand 14 to thereby lock the arm member 22 against rotation to the support stand 14. Similar locking means 58 are preferably provided to lock the arm member 22 to the tube 32 but, for the sake of brevity, the locking means 58 will not be described in detail.

Although the locking means 42 and 58 may be individually actuated, preferably a lever arrangement 60 is provided on the arm 22 to simultaneously actuate the locking means 42 and 58. The lever arrangement comprises a lever 62 pivotally mounted by a pivot pin 64 to the arm member 22. A pair of longitudinal links 66 extend from the upper end of the lever 62 and each link 66 connects to a radial arm 68 secured to the outwardly extending end of the threaded member 44 on each locking means 42 and 58. Consequently, rotation of the lever 62 around the pivot pin 64 simultaneously rotates or pivots both threaded members 44 in both the locking means 42 and 58 to thereby lock the arm member 22 to the support stand 14 and the tube 32 in their respective adjusted rotated positions.

A modification to the attachment 10 of the present invention is illustrated in FIGS. 5-8. In the modification the arm member 22 is segmented into a first portion 80 which is rotatably secured to the support stand 14 at its outer axial end and a second portion 82 which is rotatably secured to the tube 32 at its outer axial end. The first and second portions 80 and 82, respectively, are coaxially secured together and for this purpose a cylindrical axial recess 84 is formed in the inner axial end of the first portion 80. A cylindrical boss 86 formed on the inner axial end of the second portion 82 is received within the recess 84 so that the second portion 82 is rotatable around its longitudinal axis relative to the first portion 80.

In order to lock the first portion 80 to the second portion 82 of the arm member 22 in its adjusted longitudinal rotated position, the first portion 80 is provided with an annular flange 88 which coaxially abuts against and mates with an annular flange 90 on the second portion 82. As best shown in FIGS. 6 and 7, two diametrically opposed circular slots 92 and 94 are provided through the annular flange 90 on the second arm member portion 82. A bolt member 96 having an enlarged head portion 100 extends through each slot 92 and 99 and threadedly engages a threaded bore 98 in the annular flange 88 on the first portion 80. The enlarged head portions 100 on the bolt members abut against the annular flange 90 so that upon loosening of the bolt members 96, the second portion 82 with the attached power means 16 may be longitudinally rotated relative to the first portion 80 to the desired rotational position such as shown in FIG. 8. In doing so the circumferential position of the bolt members 96 along the circular slots 92 and 94 is varied. Thereafter the bolt members 96 are tightened thus compressing the flanges 88 and 90 together and locking the rotational position of the second arm portion 82 relative to the first arm portion 80.

As shown in FIG. 5, preferably an indicia scale 102 is provided on the outer periphery of the annular flanges 88 and 90 so that the desired rotational position of the second arm portion 82 relative to the first arm portion 80 may be easily and accurately obtained. In addition, as is also shown in FIG. 5, each of the locking means 42 and 58 for locking the arm member 22 to the support stand 14 and the tube 32, respectively, is provided with an individual locking handle 104. Thus with the handles 104, the arm member 22 may be independently locked to the support stand 14 or the tube 32 as desired.

FIG. 9 illustrates a preferred embodiment of the present invention in which the power tool means 16 is attached to the support column 14 in the conventional manner but the attachment 10 is utilized to rotatably mount the work support 18 to the support column 14.

It can thus be seen that the attachment 10 of the present invention provides a novel, simple and inexpensive means by which the machining radius for a rotary drive machine 16, such as a drill press, may be variably and infinitely adjusted. The attachment 10 thus greatly enhances the overall versatility of the rotary drive machine 12 by the provision of the two spaced vertical axes of rotation of the power tool means 16 relative to the support stand 14. In addition, the longitudinal rotational adjustability of the arm member 22 as shown in the modified form of the invention even further increases the flexibility and versatility of the rotary drive machine 12.

Having thus described my invention, many modifications thereto will become apparent to those skilled in the art to which it pertains without deviation from the spirit of the invention as defined by the scope of the appended claims.

I claim:

1. An attachment for a rotary drive machine of the type having a cylindrical support columm, a work support member and first means for rotatably mounting said work support member to said support column at a point spaced downwardly from the upper end thereof, and a power tool means and a second means for rotatably mounting said power tool means to the upper end of the support column whereby said support column supports said power tool means above the work support member, said attachment comprising a horizontally elongated arm member, a first tubular portion secured at one longitudinal end of said arm member and a second tubular member being secured to the other longitudinal end of said arm member, each tubular member including an internal bore formed therein of the same diameter as the diameter of said support column, the axes of said internal bores being spaced and parallel to each other and substantially perpendicular to the longitudinal axis of said arm member, wherein said internal bore in said first tubular member is a throughbore adapted to be slidably received over said support column, and means for axially adjustably locking said first tubular member to said support column, a cylindrical member of substantially the same diameter as said support column and means for rotatably mounting said cylindrical member in the internal bore of the second tubular member so that said cylindrical member extends vertically upwardly from said second tubular member whereby the upwardly extending portion of the cylindrical member is adapted to supportingly engage and cooperate with either of said first and second rotatable mounting means so that the attachment can alternatively supportingly connect either the work support member or the power tool means to the support column.

2. The invention as defined in claim 1 and including means for simultaneously locking said support column and said cylindrical member against rotation relative to said attachment.

3. The invention as defined in claim 2, wherein said locking means further comprises a first and second cam member mounted in said first and second tubular portions, respectively, and adapted, upon actuation, to respectively frictionally engage the support column and the cylindrical member, and handle means for simultaneously actuating said cam members.

4. An attachment for a rotary drive machine of the type having a cylindrical support column, a work support member and first means for rotatably mounting said work support member to said support column at a point spaced downwardly from the upper end thereof, and a power tool means and a second means for rotatably mounting said power tool means to the upper end of the support column whereby said support column supports said power tool means above the work support member, said attachment comprising a horizontally elongated arm member, a first tubular portion secured at one longitudinal end of said arm member and a second tubular member being secured to the other longitudinal end of said arm member, each tubular member including an internal bore formed therein of the same diameter as the diameter of said support column, the axes of said internal bores being spaced and parallel to each other and substantially perpendicular to the longitudinal axis of said arm member, wherein said internal bore in said first tubular member is a throughbore adapted to be slidably received over said support column, and means for axially adjustably locking said first tubular member to said support column, a cylindrical member of substantially the same diameter as said support column, means for rotatably mounting said cylindrical member in the internal bore of the second tubular member so that said cylindrical member extends vertically upwardly from said second tubular member whereby the upwardly extending portion of the cylindrical member is adapted to supportingly engage and cooperate with either of said first and second rotatable mounting means and means for simultaneously locking said support column and said cylindrical member against rotation relative to said attachment, wherein said locking means further comprises a first and second cam member mounted in said first and second tubular portions, respectively, and adapted, upon actuation, to respectively frictionally engage the support column and the cylindrical member, and handle means for simultaneously actuating said cam members.

* * * * *